United States Patent
Wimmer et al.

(10) Patent No.: US 9,174,642 B2
(45) Date of Patent: Nov. 3, 2015

(54) MOTOR VEHICLE HAVING A DRIVER ASSISTANCE DEVICE AND METHOD FOR OPERATING A MOTOR VEHICLE

(71) Applicant: AUDI AG, Ingolstadt (DE)

(72) Inventors: Martin Wimmer, Regensburg (DE); Juergen Meurle, Ingolstadt (DE); Heike Sacher, Munich (DE); Karl-Heinz Siedersberger, Koenigsmoos (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/377,133

(22) PCT Filed: Feb. 5, 2013

(86) PCT No.: PCT/EP2013/000345
§ 371 (c)(1),
(2) Date: Aug. 6, 2014

(87) PCT Pub. No.: WO2013/117321
PCT Pub. Date: Aug. 15, 2013

(65) Prior Publication Data
US 2015/0032322 A1    Jan. 29, 2015

(30) Foreign Application Priority Data
Feb. 6, 2012  (DE) .................. 10 2012 002 306

(51) Int. Cl.
*B60W 30/14* (2006.01)
*B60W 50/08* (2012.01)
(Continued)

(52) U.S. Cl.
CPC .............. *B60W 30/143* (2013.01); *B60K 35/00* (2013.01); *B60K 37/06* (2013.01); *B60W 50/08* (2013.01);
(Continued)

(58) Field of Classification Search
None
See application file for complete search history.

(56) References Cited

U.S. PATENT DOCUMENTS 8,634,980 B1 * 1/2014 Urmson et al. ................ 701/23
2008/0251311 A1 10/2008 Waibel et al.
(Continued)

FOREIGN PATENT DOCUMENTS

CN           102795256 A  *  5/2011  ............... B62D 1/04
DE    10 2006 060 554 A1    6/2008
(Continued)

OTHER PUBLICATIONS

German Office Action for corresponding German Patent Application No. 10 2012 002 306.5, issued Dec. 23, 2014, 8 pages.
(Continued)

*Primary Examiner* — Mussa A Shaawat
*Assistant Examiner* — Abdhesh Jha
(74) *Attorney, Agent, or Firm* — Staas & Halsey LLP

(57) ABSTRACT

A motor vehicle has a driver assistance device to guide the motor vehicle in an automated manner during travel. The driver assistance device can be switched between a plurality of assistance modes. First, second and third control device differ in the actions the control. The first operating device directly drives the motor vehicle by the driver of the motor vehicle in a manual mode. The second operating device adjusts driving parameters for a partially automated assistance mode, and the third operating device serves as a user interface for the fully automated assistance mode. In a fully automated assistance mode, the driver assistance device provides independent lateral guidance and controls a wheel steering angle. In this case, an actuator adjusts a rotary position of the steering wheel to follow the wheel steering angle set by the driver assistance device.

21 Claims, 2 Drawing Sheets

(51) Int. Cl.
　　*B60K 35/00*　　(2006.01)
　　*B60K 37/06*　　(2006.01)
　　*B62D 15/02*　　(2006.01)
　　*B60W 30/12*　　(2006.01)
　　*B60W 30/16*　　(2012.01)

(52) U.S. Cl.
　　CPC ........... *B62D 15/026* (2013.01); *B60K 2310/00* (2013.01); *B60K 2310/30* (2013.01); *B60K 2350/1004* (2013.01); *B60K 2350/104* (2013.01); *B60K 2350/1028* (2013.01); *B60K 2350/928* (2013.01); *B60W 30/12* (2013.01); *B60W 30/16* (2013.01); *B60W 50/082* (2013.01)

(56) References Cited

U.S. PATENT DOCUMENTS

| | | | |
|---|---|---|---|
| 2009/0287367 A1* | 11/2009 | Salinger | 701/23 |
| 2010/0250066 A1 | 9/2010 | Eckstein et al. | |
| 2012/0083960 A1* | 4/2012 | Zhu et al. | 701/23 |
| 2013/0002416 A1* | 1/2013 | Gazit | 340/438 |
| 2013/0276571 A1* | 10/2013 | Takayasu | 74/552 |

FOREIGN PATENT DOCUMENTS

| | | |
|---|---|---|
| DE | 112005003669 | 6/2008 |
| DE | 10 2007 000 939 A1 | 3/2009 |
| DE | 10 2010 022 433 A1 | 12/2011 |
| DE | 10 2010 022 620 A1 | 12/2011 |
| DE | 10 2012 002 306.5 | 2/2012 |
| EP | 2013/000345 | 2/2013 |
| WO | WO 99/52761 A1 | 10/1999 |
| WO | WO 2007/021263 A1 | 2/2007 |
| WO | WO 2007/038884 A1 | 4/2007 |

OTHER PUBLICATIONS

International Search Report mailed Jun. 11, 2013 for corresponding International Patent Application No. PCT/EP2013/000345.

* cited by examiner

MOTOR VEHICLE HAVING A DRIVER ASSISTANCE DEVICE AND METHOD FOR OPERATING A MOTOR VEHICLE

CROSS REFERENCE TO RELATED APPLICATIONS

This application is based on and hereby claims priority to International Application No. PCT/EP2013/000345 filed on Feb. 5, 2013 and German Application No. 10 2012 002 306.5 filed on Feb. 6, 2012, the contents of which are hereby incorporated by reference.

BACKGROUND

The invention relates to a motor vehicle having a driver assistance device, which is designed to drive the motor vehicle independently during a journey of the motor vehicle and which in this case is switchable between at least two assistance modes which differ from one another in a degree of the independence of the driver assistance device during the driving of the motor vehicle.

Driving the motor vehicle denotes firstly the steering of the motor vehicle (following a course of a road, orienting the motor vehicle within a lane, lane change maneuver), which is also designated as transverse driving, and secondly the control of the driving speed of the motor vehicle (acceleration, braking, emergency braking, maintaining speed), which is also designated as longitudinal driving.

A driver assistance system of the type mentioned is known from DE 10 2010 022 433 A1. According to that, a driver assistance system in a fully automatic assistance mode can perform the driving of the vehicle completely independently. During the journey, the driver of the motor vehicle then does not have to operate either the steering wheel or the pedals of the motor vehicle and can therefore devote his/her attention to other things for a comparatively long period of time, such as the operation of an infotainment system, for example.

Independent driving of the motor vehicle should also be understood to mean a partly automatic assistance mode, in which the degree of the independence of the driver assistance system during the driving of the motor vehicle is reduced and which can then include, for example, merely the functionality of adjusting the driving speed of the motor vehicle to a setpoint or set speed that the driver predefines by setting a value of the corresponding driving parameter of the driver assistance system (driving speed control).

A further desirable assistance mode is the autonomous driving of the motor vehicle by a driver assistance device. In contrast to the fully automatic assistance mode, in the autonomous assistance mode, the driver assistance device also decides what values are to be implemented in the case of the driving parameters (setpoint distances, setpoint speed) for a driving maneuver currently being performed and/or what driving maneuvers (lane change, turning, parking and the like) are to be performed. In the fully automatic assistance mode, by contrast, provision is made for the driver to stipulate via a user interface what driving maneuvers are to be performed and/or what distances and speeds in the case of a driving maneuver currently being performed, by the driver assistance device, are intended to be adjusted when traveling in a lane. Another difference between the two assistance modes may be how the driver assistance device reacts in the event of an unforeseen development in the traffic situation, that is to say if safe driving by the driver assistance device is no longer ensured. In the fully automatic assistance mode, provision is then made for the driver assistance device to deactivate itself and to pass control of the motor vehicle to the driver, whereas in the autonomous assistance mode the motor vehicle is brought to a safe state by the driver assistance device itself by e.g. stopping the motor vehicle.

Depending on the instantaneously active assistance mode during the journey, a driver of the motor vehicle has the impression that specific driving tasks are carried out by the motor vehicle independently without said driver's control. In this case, for each assistance mode in which the driver assistance device can be operated, it must be ensured that it is always clear to the driver to what degree the driver assistance system monitors and drives the motor vehicle, what intervention possibilities are still provided for the driver himself/herself during the driving of the motor vehicle, and what driving tasks the driver must necessarily perform himself/herself. If the driver loses track here, the driver's safety can be jeopardized. By way of example, if the driver imagines that the driver assistance device is in the fully automatic assistance mode and the driver therefore releases the steering wheel in order to deal with the infotainment system, the vehicle may in this case leave the lane because the driver assistance device is e.g. not activated at all, that is to say that a fully manual manner of driving is demanded of the driver (therefore designated here as manual assistance mode).

The spectrum of the independence of the driver assistance device (automation spectrum) extending from manual travel through partial and full automation as far as autonomy, in terms of its complexity, in the future, is intended to be transparent to the user and operable in a comprehensible manner for the user. A manageable complexity of these four assistance modes mentioned, a clear delimitability of the individual assistance modes and characteristic operating modalities within the individual assistance modes are important properties of future operating concepts. While established operating elements such as buttons, steering wheel or levers are available for partial automation (e.g. driving speed control, active lane control, i.e. lane keeping assistance), to date there have only been conceptual approaches for the prototypical operation of full automation and autonomy. These approaches are often merely supplementations or extensions of existing operating concepts and constitute isolated standalone solutions. Such standalone solutions generally amount to nothing more than mere functional integration into existing operating elements, which leads to an increase in the functional density of the individual operating elements and is therefore not expedient owing to the diversity and complexity of the resultant operating devices. The handleability and functional diversity of current operating elements have already been exhausted.

SUMMARY

One potential is object, in the context of a motor vehicle having a driver assistance system which can drive the motor vehicle wholly or partly independently, to ensure clarity in its operation.

The inventors propose a driver assistance device is designed to carry out at least independent transverse driving of the motor vehicle in a fully automatic assistance mode, at least speed control in a partly automatic assistance mode and no driving of the motor vehicle at all in a manual assistance mode. The proposed motor vehicle additionally comprises three operating devices, which differ from one another in that the operating actions to be performed for their operation are different. A dedicated operating device is now assigned to each of the assistance modes. In this case, the first operating device is designed for the direct driving of the motor vehicle by a driver of the motor vehicle. The first operating device can be a steering wheel and pedals, for example. The second operating device is designed for setting driving parameters (setpoint distances, setpoint speed) for the partly automatic assistance mode and can have an operating element, for example, which is arranged on a steering wheel of the motor vehicle and in this case then preferably comprises a pushbutton switch, a rocker switch or a rotary wheel. Finally, the third operating device is designed for operating a user interface for the fully automatic assistance mode. The user interface can be the one filed in a patent application by the applicant together with the present application on the same date. The third operating device can likewise be arranged on the first operating device, that is to say for instance the steering wheel. The third operating device can be, for example, a touch-screen (touch-sensitive screen) arranged on an impact absorber of the steering wheel. Via said user interface, in a fully automatic assistance mode, it is possible that a driver can select a driving maneuver to be performed independently by the driver assistance device and/or can set a driving parameter of a driving maneuver currently being performed.

The proposals are based on the insight that the driver of the motor vehicle or operator of the driver assistance device, for each assistance mode of the automation spectrum (manual travel, partial automation, full automation), should be provided with an autonomous interaction medium embodied by the respective operating device and having an autonomous interaction form. In the case of this divided concept, local proximity of the different operating devices is advantageous but not mandatory. Providing three different operating devices means that it is not necessary to allocate different functions to individual operating elements depending on which assistance mode is currently active. This effectively prevents an operator of the driver assistance device from operating the latter erroneously. The fact that the operating actions for each operating device are different also at the same time results in a different operating pattern of the driver assistance device in each of the assistance modes or for manual travel effected by the driver. It thus becomes very much easier for the user to remember the operating procedure.

Expediently, in at least one assistance mode it is furthermore provided that at least one of the operating devices is deactivated. In this regard, by way of example, provision can be made, in the fully automatic assistance mode, for blocking the operating device for the partly automatic assistance mode, such that a driver attempting to operate the driver assistance device via said operating device is immediately reminded that this is not possible in the instantaneously active assistance mode.

One advantageous configuration of the motor vehicle provides for mounting at least one of the operating devices movably in the motor vehicle and for providing an actuator in the motor vehicle for adjusting a position of the movably mounted operating device. In this case, the driver assistance device is then designed to set the position of the at least one operating device in a manner dependent on the instantaneously active assistance mode by activation of the at least one actuator. This affords the advantage that the position of the operating devices makes it clear to the driver what assistance mode is currently active and what operating actions the driver can thus perform at present.

In this regard, provision can be made, in particular, for mounting at least two operating devices movably relative to one another and for designing the driver assistance device to set a relative position of the at least two operating devices with respect to one another in a manner dependent on the instantaneously active assistance mode by activation of an actuator. By way of example, if a touch-screen is arranged as a third operating device on the impact absorber of the steering wheel, then, when the fully automatic assistance mode is activated, the steering wheel (in relation to the touch-screen) can be moved away from the driver of the motor vehicle. As a result, the touch-screen comes to the fore for the driver, thereby making it clear to the driver that now the driver no longer has to use the steering wheel, but rather has to operate the user interface for the fully automatic assistance mode.

Expediently, for the case where the operating device comprises a steering wheel, the motor vehicle comprises an actuator designed to generate on the steering wheel a force feedback for a user of the steering wheel, such that the steering wheel is rotatable by the actuator. In this case, the driver assistance device in the motor vehicle is then designed to generate a control signal for controlling the force feedback to the actuator in the fully automatic assistance mode. As a result, in accordance with the method proposed by the inventors, the rotary position of the steering wheel can be set in a manner dependent on a wheel lock angle instantaneously set by the driver assistance device. From the steering lock of the steering wheel the driver can then see how the driver assistance device is steering the motor vehicle at present. Moreover, for the case where the fully automatic assistance mode has to be switched off in an emergency situation and the driver has to spontaneously reassume the driving of the motor vehicle, it is advantageous if the steering wheel already has the correct steering lock.

In one particularly preferred embodiment of the motor vehicle, in the case of the driver assistance device, an autonomous assistance mode is additionally provided, in which the driver assistance device itself drives the motor vehicle completely and in this case also independently selects driving maneuvers to be carried out. Such an assistance mode is expedient for example if the motor vehicle is in a backup. During this time the driver can then devote his/her attention completely to a different activity, for example operating the infotainment system or reading a newspaper. Preferably, in this case, operating possibilities for an infotainment system of the motor vehicle are offered to the driver via the third operating device by virtue of functions of the infotainment system being assigned to individual operating elements of the third operating device, such that they can be activated by the actuation of said operating elements.

Developments of the method may have features that have already been explained in connection with the developments of the motor vehicle. Therefore, these developments of the method are not described again here.

The features and feature combinations mentioned above in the description and the features and feature combinations mentioned below in the description of the figures and/or shown in the figures alone can be used not only in the combination respectively specified, but also in other combinations or by themselves.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
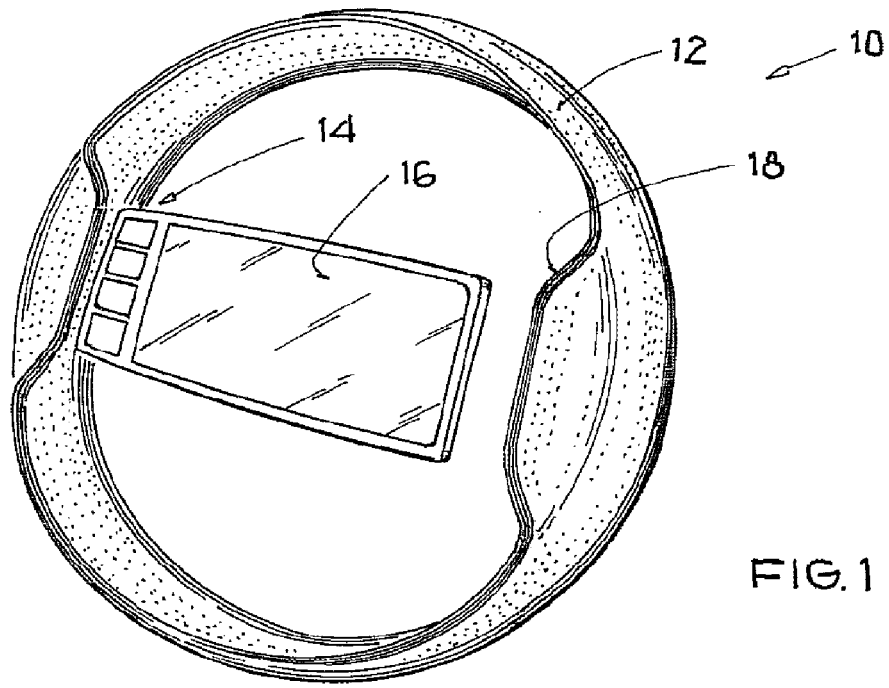
FIG. 1 shows a schematic illustration of a steering wheel of one embodiment of the proposed motor vehicle in perspective view, wherein a relative position of components of the steering wheel is set by a driver assistance device that is operated in a manual or a partly automatic assistance mode.

Reference will now be made in detail to the preferred embodiments of the present invention, examples of which are illustrated in the accompanying drawings, wherein like reference numerals refer to like elements throughout.

Figure 2:
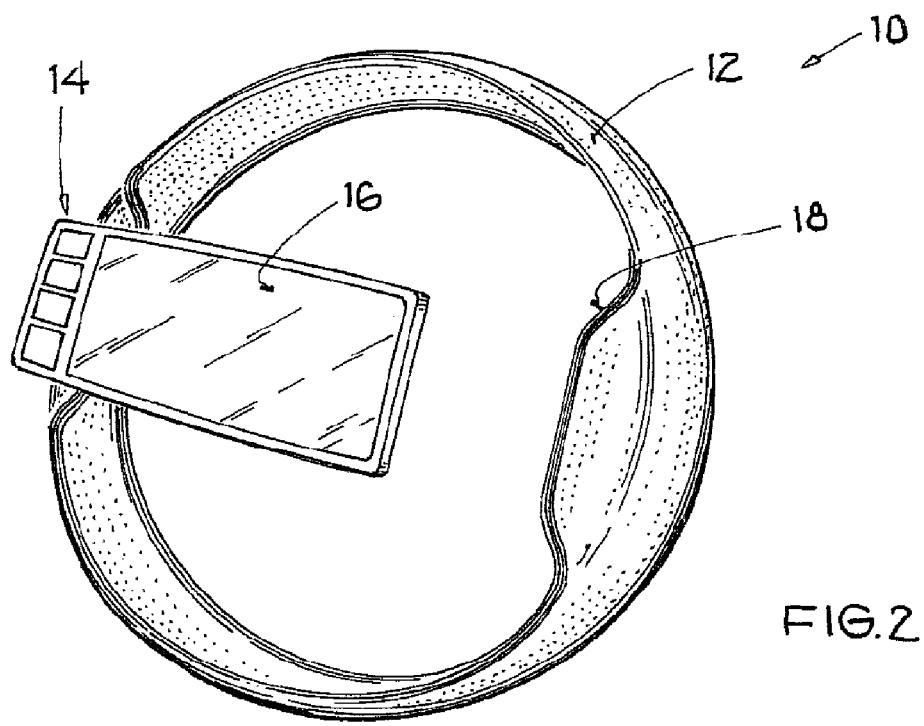
FIG. 2 shows the steering wheel from FIG. 1, wherein the relative position of the components is set for a fully automatic assistance mode of the driver assistance device.
Figure 3:
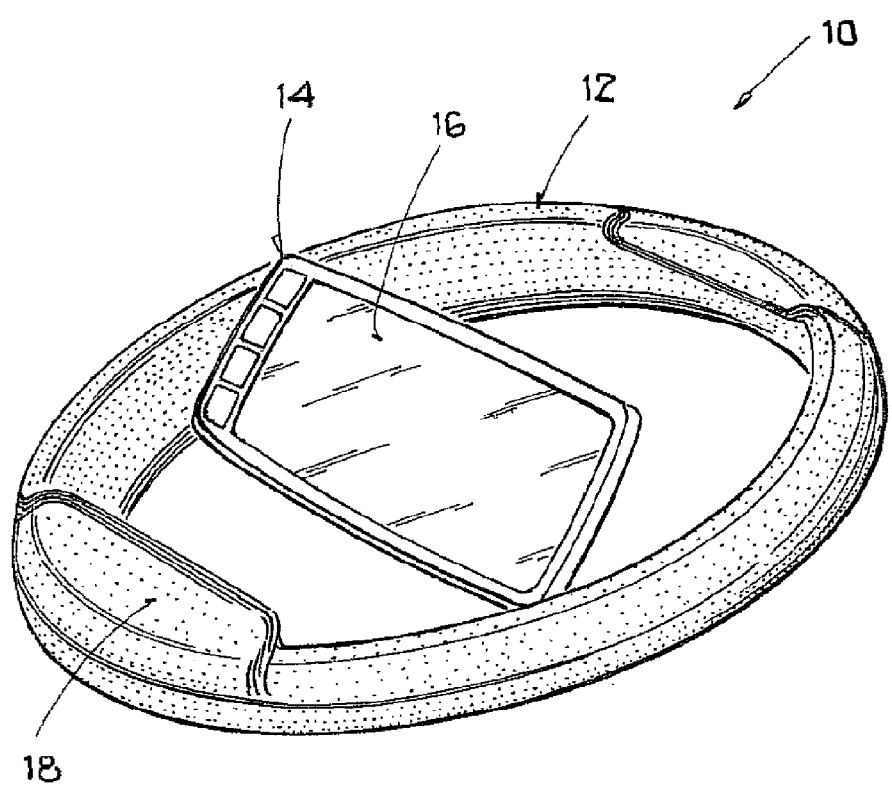
FIG. 3 shows the steering wheel from FIG. 1, wherein the components thereof are set for an autonomous assistance mode of the driver assistance device.

FIGS. 1 to 3 illustrate a steering wheel 10 having a steering wheel rim 12, a keypad 14 and a touch-screen 16 (touch-sensitive screen). The touch-screen 16 is fixed on an impact absorber (not illustrated) of the steering wheel 10. A palm rest 18 is formed on the steering wheel rim 12. Supporting elements not required for explaining are not illustrated in FIGS. 1 to 3, for the sake of clarity.

The steering wheel 10 is incorporated in a motor vehicle not illustrated further, for example a car. The motor vehicle comprises a driver assistance device, which can be operated in a manual assistance mode, a partly automatic assistance mode, a fully automatic assistance mode and an autonomous assistance mode. The manual assistance mode corresponds to a deactivated state of the driver assistance device, in which the driver assistance device only reacts to an activation signal. In the partly automatic assistance mode, the driver assistance device carries out longitudinal driving of the motor vehicle in the form of driving speed control and lane keeping assistance (designated here together as ACC—active cruise control). By contrast, transverse driving of the motor vehicle should still be carried out by the driver of the motor vehicle. In the fully automatic assistance mode, the motor vehicle is driven completely by the driver assistance device, wherein a driver of the motor vehicle can select the driving maneuvers to be performed (overtaking a vehicle traveling ahead, turning, parking, lane change and the like) or else can set driving parameter values with respect to a driving maneuver currently being performed, said driving parameter values defining the driving behavior of the driver assistance device (setpoint distances, setpoint speeds and the like). In an autonomous assistance mode, the driver assistance device additionally also independently defines what driving maneuvers are to be performed. The autonomous assistance mode can be activated, for example, if the driver assistance device recognizes that the motor vehicle is in a backup and can be driven at most at walking speed.

In the manual assistance mode, the driver can use the steering wheel 10 as usual as a normal steering wheel for manual travel. In this case, the impact absorber of the steering wheel 10 is freely configurable in terms of its appearance by the touch-screen 16. It is possible, during manual travel, by way of example, to display infotainment contents and to enable operation of the infotainment system of the motor vehicle. Another possibility is to display a logo of the manufacturer of the motor vehicle, which concomitantly moves with the current steering angle of the steering wheel 10 or, alternatively, can be implemented as stationary relative to a horizontal.

In the partly automatic assistance mode, in the exemplary embodiment shown, the driver assistance system is operated via key elements of the keypad 14. The speed can be made possible, for example, via a monostable rocker arranged centrally. The other ACC functionalities can be activated or deactivated via various further keys that can be arranged around said rocker. Provision can also be made for a distance setting of the ACC system to be performed via the touch-sensitive field of the touch-screen 16. Since distance control is used comparatively infrequently, this affords the advantage that it is inserted only as necessary and there is no need to provide a separate operating element. In partial automation, the touch-screen 16 is firmly fixed relative to the steering rim 12, with the result that it concomitantly moves during steering.

Further elements for the operation of the driver assistance system in the partly automatic assistance mode may be, for example, a steering column lever and, if appropriate, a paddle (monostable toggle switch with a flat, wing-shaped operating lever that can be grasped by two fingers), which can be arranged on a side of a spoke of the steering wheel 10 or of the steering rim 12 that faces away from the driver.

The fully automatic assistance mode can be activated, for example, via a corresponding area in the touch-screen 16. Upon transition to the fully automatic assistance mode, the steering wheel rim 12 is moved from the driver by preferably only a few centimeters in the vehicle longitudinal direction by an actuator of the motor vehicle, in a manner decoupled from the touch-screen 16. The actuator can be an electromechanical actuator, e.g. an electric motor. Even in the position moved to for the fully automatic assistance mode, the steering wheel rim 12 can still be reached by the driver, even if the driver leans back in the driver's seat. As a result, in the case of an urgent request to take over driving, i.e. upon termination of the fully automatic assistance mode, the driver can take over the driving of the motor vehicle himself/herself. Consequently, an important feature of the operation of the driver assistance device in the fully automatic assistance mode is that the operating elements for longitudinal and transverse driving of the vehicle are still positioned in the primary grasping area for the driver, such that, in a normal sitting position in the driver's seat, the driver can therefore still grasp the steering wheel rim 12 and can thus rapidly take over driving again himself/herself.

The steering wheel rim 12 is furthermore actively rotatable by the driver assistance device via a further actuator, such that the position of the steering rim is set in a manner dependent on an instantaneously set wheel adjustment angle. In the case where the driver intervenes if the fully automatic assistance mode is ended, the position of the front wheels is reported back to the driver by the position of the steering wheel rim 12.

In the fully automatic assistance mode, the touch-screen 16 remains directly accessible to the driver centrally and in a stationary manner. The operation of the driver assistance device in the fully automatic assistance mode takes place via a parameter and maneuver interface on the touch-screen 16. Here, the driver can set, for example, what setpoint distance the motor vehicle should maintain with respect to a vehicle traveling ahead or what transverse position the motor vehicle should have in the lane in which the vehicle is currently traveling. The setpoint distance and the transverse offset constitute driving parameters for the fully automatic assistance mode according to which the current driving maneuver is performed. In addition, the driver can also select a different driving maneuver (overtaking, lane change, parking, turning) that are to be performed by the driver assistance device at the next opportunity.

The driver assistance device monitors the surroundings of the motor vehicle by a monitoring device. The monitoring device can comprise a camera and/or a distance radar, for example, by which objects in the surroundings can be identified in a manner known per se. If the driver assistance device recognizes here that completely autonomous driving of the motor vehicle by the driver assistance device is possible, for example because the motor vehicle in a backup can only be driven in a stop-and-go manner of driving and at most at walking speed, then the driver assistance device indicates to the driver that it is possible to change to the autonomous assistance mode. The autonomous assistance mode can be activated by the driver for example via the touch-screen 16. Extended infotainment contents can then be provided for the driver on the touch-screen 16, since the driver now no longer has to be prepared at any time to take over the driving of the vehicle in an emergency situation. For the case where automated driving of the motor vehicle is identified as unsafe, in the autonomous assistance mode the motor vehicle is instead brought to a safe state by the driver assistance device itself by bringing the motor vehicle to a standstill, for example.

In order to provide the driver with the possibility of extended interaction with the infotainment system, more convenient operation can be made possible by tilting and, if appropriate, movement of the touch-screen 16 and of the steering wheel rim 12 (see FIG. 3). The touch area of the touch-screen 16 serves as an input medium for the extended infotainment contents (for example as keyboard and/or mouse touch pad for office activities) and the palm rest 18 is tilted downward. Both the touch-screen 16 and the steering wheel rim 12 with the palm rest 18 are now completely decoupled from the steering linkage, such that they are stationary while the driver assistance device changes the wheel lock angle.

Upon deactivation of the different assistance modes, under certain circumstances, active movement of the individual elements (steering wheel rim 12, keypad 14 and touch-screen 16) may be necessary. By way of example, if the autonomous assistance mode is deactivated, both the steering wheel rim 12 and the touch-screen 16 have to be set in such a way that the current steering wheel angle as steering angle of the steering rim 12 and the touch-screen 16 are again available as an integral element to the driver for manual travel or for partial automation in standby operation.

The steering wheel rim 12, the keypad 14 and the touch-screen 16 respectively constitute an operating element, wherein the operating actions to be performed for operating these three operating elements clearly differ from one another. In this case, the steering wheel rim 12 is primarily provided for manual travel, the keypad 14 for the operation of the driver assistance device in the partly automatic assistance mode, and the touch-screen 16 for the operation of the user interface in the fully automatic assistance mode. By virtue of the different operating actions in the individual assistance modes, for the user these assistance modes are easier to understand and can be delimited from one another more precisely. The system transparency is increased within an assistance mode and between the assistance modes. This makes it very much clearer to the user what influencing possibilities the user has on the driving of the motor vehicle in what assistance mode. As a result of the delimitation of the keypad 14 from the touch-screen 16, the complexity of the partly automatic assistance mode is not increased unnecessarily. For the fully automatic assistance mode, moreover, by the touch-screen 16 shown, for example, novel forms of interaction can be provided (touch-sensitive area, force feedback). These forms of interaction can then be optimally coordinated with the requirements of the driver assistance system in the fully automatic assistance mode. Providing the touch-screen on the impact absorber of the steering wheel additionally opens up the possibility of offering to the driver extended infotainment contents (displaying messages or emails, making it possible to view Internet pages and the like) in the autonomous assistance mode.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A motor vehicle comprising:
   a driver assistance device to drive the motor vehicle independently during a journey of the motor vehicle, the driver assistance device being switchable between a plurality of assistance modes which differ from one another in a degree of independence of the driver assistance device during driving of the motor vehicle, the assistance modes comprising a fully automatic assistance mode in which independent transverse driving is provided, a partly automatic assistance mode in which at least speed control is provided and a manual assistance mode in which no driving assistance is provided;
   a first operating device comprising a steering wheel operated in the manual assistance mode by a steering action for direct driving of the motor vehicle by a driver of the motor vehicle;
   a second operating device to set driving parameters for the partly automatic assistance mode; and
   a third operating device comprising a touch-screen arranged on an impact absorber of the steering wheel, the touch-screen being operated as a user interface for the fully automatic assistance mode, the touch-screen being mounted movably relative to the steering wheel;
   a position setting device to set relative positions of the steering wheel and the touch-screen with respect to one another in a manner dependent on an instantaneously active assistance mode.

2. The motor vehicle as claimed in claim 1, wherein at least one of the operating devices is deactivated in at least one assistance mode.

3. The motor vehicle as claimed in claim 2, wherein the second operating device to set driving parameters for the partly automatic assistance mode, is deactivated in the fully automatic assistance mode.

4. The motor vehicle as claimed in claim 1, wherein
   a movable operating device of the plurality of operating devices is mounted movably in the motor vehicle,
   the motor vehicle comprises an actuator to adjust a position of the movable operating device in the motor vehicle, and
   the driver assistance device sets the position of the movable operating device in a manner dependent on the instantaneously active assistance mode.

5. The motor vehicle as claimed in claim 1, wherein the second operating device is arranged on the steering wheel.

6. The motor vehicle as claimed in claim 1, wherein
   the steering wheel has an actuator to generate on the steering wheel a force feedback for the driver using the steering wheel, and
   the driver assistance device generates a control signal for the actuator, to control the force feedback in the fully automatic assistance mode.

7. The motor vehicle as claimed in claim 1, wherein, via the touch-screen in the fully automatic assistance mode, the driver selects a driving maneuver to be carried out independently by the driver assistance device and/or sets a driving parameter to alter a driving maneuver currently being carried out.

8. The motor vehicle as claimed in claim 1, wherein
the assistance modes of the driver assistance device further comprise an autonomous assistance mode, to drive the motor vehicle fully automatically by independent transverse and longitudinal driving, and
in the autonomous assistance mode, the driver assistance device selects driving maneuvers to be carried out and/or sets a driving parameter to alter a driving maneuver currently being carried out.

9. The motor vehicle as claimed in claim 8, wherein
the steering wheel does not rotate in the autonomous assistance mode.

10. The motor vehicle as claimed in claim 9, wherein
the motor vehicle further comprises a rotation actuator, and
upon deactivation of the autonomous assistance mode, the rotation actuator rotates the steering wheel so that an angle of the steering wheel matches an angle of front wheels of the motor vehicle.

11. The motor vehicle as claimed in claim 9, wherein
in the autonomous assistance mode, the touch-screen serves as the user interface for an infotainment system of the motor vehicle.

12. The motor vehicle as claimed in claim 11, wherein
neither the steering wheel nor the touch-screen rotates in the autonomous assistance mode, and
the touch-screen tilts with respect to the steering wheel in the autonomous assistance mode.

13. The motor vehicle as claimed in claim 8, wherein
the touch-screen tilts with respect to the steering wheel in a manner dependent on the instantaneously active assistance mode.

14. The motor vehicle as claimed in claim 1, wherein
the second operating device comprises an operating element arranged on the steering wheel, and
the operating element is selected from the group consisting of a pushbutton switch, a rocker switch and a rotary wheel.

15. The motor vehicle as claimed in claim 1, wherein
driving parameters for the partly automatic assistance mode are set by both the second operating device and the touch-screen.

16. The motor vehicle as claimed in claim 1, wherein
the touch-screen rotates with the steering wheel in the partly automatic assistance mode and the manual assistance mode.

17. The motor vehicle as claimed in claim 1, wherein the steering wheel is recessed from the driver and the touch-screen in a manner dependent on the instantaneously active assistance mode.

18. The motor vehicle as claimed in claim 1, wherein the steering wheel is recessed from the driver and the touch-screen in the fully automatic assistance mode.

19. The motor vehicle as claimed in claim 18, wherein
the motor vehicle further comprises a rotation actuator to rotate the steering wheel to follow a steering angle of wheels of the motor vehicle in the fully automatic assistance mode.

20. The motor vehicle as claimed in claim 19, wherein the touch-screen does not rotate in the fully automatic assistance mode.

21. A method for operating a motor vehicle comprising a driver assistance device switchable between a plurality of assistance modes, to drive the motor vehicle completely independently in a fully automatic assistance mode, the method comprising:
in the fully automatic assistance mode, activating a first actuator by the driver assistance device and thereby setting a rotary position of a steering wheel of the motor vehicle in a manner dependent on a steering angle of wheels of the motor vehicle, the steering angle of the wheels being independently controlled by the driver assistance device;
in the fully automatic assistance mode, operating a touch-screen arranged on an impact absorber of the steering wheel, the touch-screen being operated as a user interface for selecting a driving maneuver to be carried out and/or for setting a driver parameter to alter a driving maneuver currently being carried out; and
when the fully automatic assistance mode is activated, activating a second actuator by the driver assistance device, the second actuator being activated to move a rim of the steering wheel away from the touch-screen and away from a driver of the motor vehicle.

* * * * *